United States Patent Office 3,549,609
Patented Dec. 22, 1970

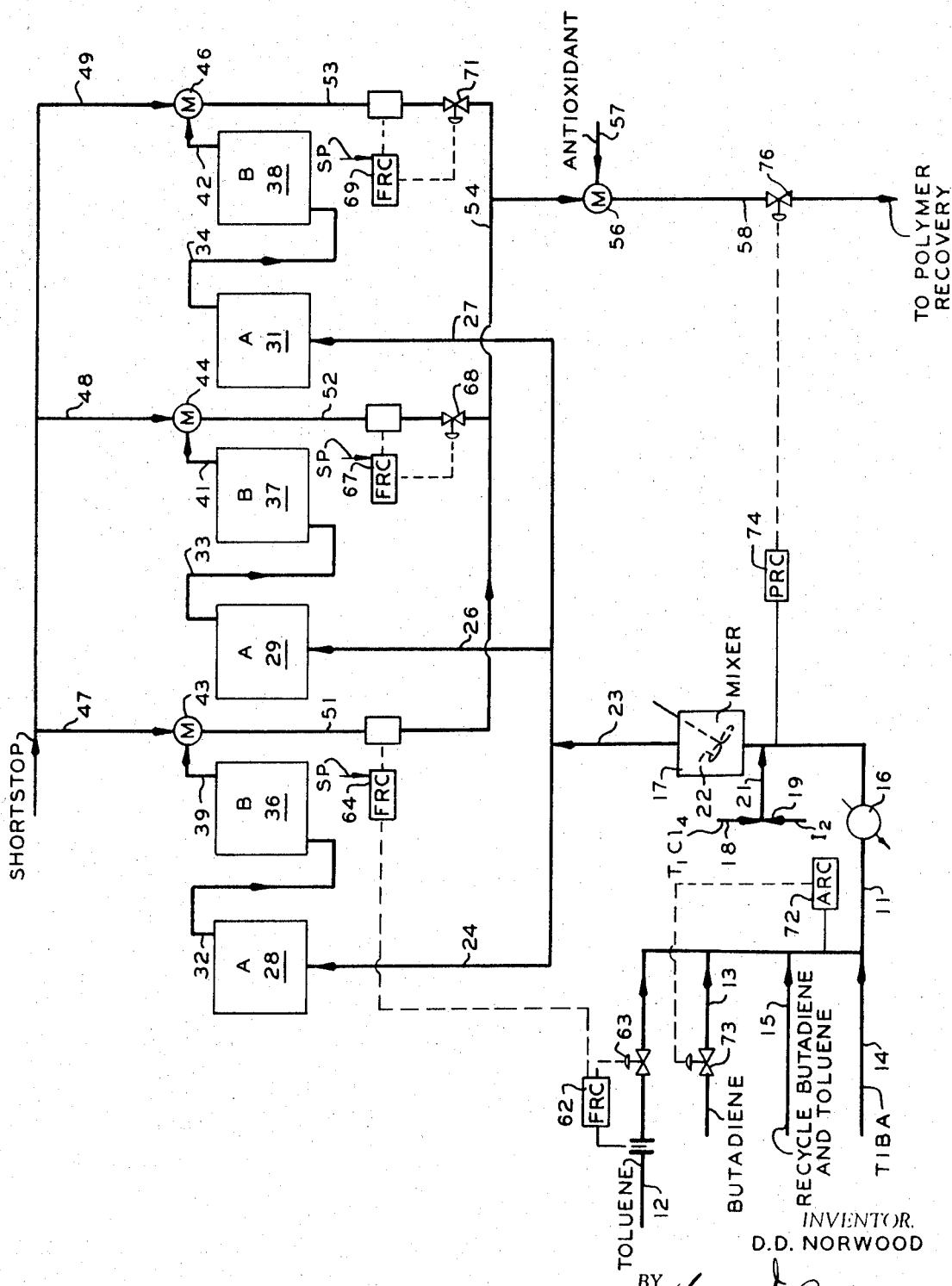

3,549,609
SERIES-PARALLEL CIS POLYBUTADIENE REACTOR TRAINS
Donald D. Norwood, Bartlesville, Okla., assignor to Phillips Petroleum Company, a corporation of Delaware
Continuation-in-part of application Ser. No. 316,052, Oct. 14, 1963. This application Dec. 16, 1968, Ser. No. 787,298
Int. Cl. C08d 3/06
U.S. Cl. 260—94.3                                6 Claims

ABSTRACT OF THE DISCLOSURE

Polybutadiene polymer having improved resistance to cold flow is produced by first mixing the catalyst with vigorous agitation for from 15 to 45 seconds in the presence of a hydrocarbon diluent and the butadiene to be polymerized. The effluent from said mixing zone is then divided into a plurality of streams, and a corresponding series of reaction zones is provided, each series of reaction zones having from 2 to 3 separate reaction zones. Each of said effluent streams is introduced into the first reaction zone in the corresponding series of reaction zones. Each reaction zone of each series of reaction zones is operated under essentially the same conditions as that in the corresponding reaction zone in another series. The effluent from the last reaction zone in each series of reaction zones is combined and polymer is recovered from this combined stream as a product of the process.

CROSS REFERENCE TO RELATED APPLICATIONS

This is a continuation-in-part of copending application Ser. No. 316,052, filed Oct. 14, 1963, entitled Series Parallel Cis Polybutadiene Reactor Trains.

BACKGROUND OF THE INVENTION

This invention relates to a process in which 1,3-butadiene is polymerized with certain specific catalysts in the presence of a diluent, and a rubbery polymer is recovered as a product of the process. In another aspect, it relates to a process in which 1,3-butadiene is polymerized to cis 1,4-polybutadiene.

In recent years a great deal of research work has been directed toward the production of improved rubbery polymers. One rubbery polymer which has received considerable attention is a polybutadiene in which at least 85 percent of the polymer is formed by cis 1,4-addition of the butadiene, the remainder of the polymer being formed by trans 1,4-addition and 1,2-addition. The physical properties of this polymer are of such a nature that the polymer is particularly suitable for the fabrication of automobile and truck tires and other rubbery articles for which conventional synthetic rubbers have heretofore been comparatively unsatisfactory. However, in the processing of high cis-polybutadiene, particularly in its packaging, shipping and storage, a certain amount of difficulty has been encountered because of the tendency of the polymer to cold flow when in the unvulcanized state. For example, if cracks or punctures develop in the package used in storing the polymer, polymer will flow from the package with a resulting product loss or contamination and sticking together of stacked packages. The present invention provides a method for reducing the tendency of cis-polybutadiene to cold flow.

SUMMARY OF THE INVENTION

It is an object of this invention to provide an improved process for the preparation of rubbery cis 1,4-polybutadiene.

A further object of the invention is to provide an improved process for polymerizing 1,3-butadiene so as to provide a polybutadiene containing a high percentage, e.g., in the range of 85 to 100 percent, of cis 1,4-addition.

Other and further objects and advantages of the invention will become apparent to those skilled in the art upon consideration of the accompanying disclosure.

The present invention is concerned with a process in which 1,3-butadiene is polymerized in the presence of a diluent with certain specific catalyst systems. The invention resides in the discovery that improved results are obtained if the catalyst system is preformed in the presence of the monomer mixture and if the polymerization is carried out in a series-parallel reaction system. In other words, given a specific number of reactors and using the same overall feed composition and reaction time, the cold flow of the product will be lower if the reactors are arranged in series-parallel arrangement rather than all in series. Use of four reactors illustrates the simplest case. Operation with two series of two reactors each produces a polymer with lower cold flow than one produced with four reactors in series, other conditions being the same. The reason for this difference is not fully understood. Obviously, the residence time per reactor is increased for the same total reaction time. In any event, the improvement in cold flow is obtained as the number of mix stages decreases.

BRIEF DESCRIPTION OF THE DRAWING

The drawing illustrates the process of this invention in schematic form.

DESCRIPTION OF THE PREFERRED EMBODIMENTS

More specifically, my invention is directed to a process in which 1,3-butadiene is polymerized in the presence of a hydrocarbon diluent with a catalyst effective for the production of cis 1,4-polybutadiene wherein the improvement comprises mixing the catalyst in the presence of said hydrocarbon diluent and the butadiene to be polymerized in a mixing zone, dividing the effluent from said mixing zone into a plurality of streams, introducing each stream into the first of a series of reaction zones, each reaction zone of each series of reaction zones being operated under the same conditions as that in the corresponding reaction zone in another series, regulating the residence time in each series of reaction zones by controlling effluent removal from each series of reaction zones, and maintaining constant pressure on the system by controlling total effluent removal.

Positive displacement flow controllers are used on the output lines from the final reactor in each series of reactors so that the flow in each series can be accurately controlled. Preferably, a shortstop is added right at the last reaction zone output to prevent gel formation and plugging of downstream equipment. In a preferred embodiment of the invention, the organometal component of the catalyst, described hereinafter, the 1,3-butadiene, and diluent are charged to the mixing zone through one line while the halogen-containing component of the catalyst is introduced by means of another line. By introducing the diluent and 1,3-butadiene in this manner, catalyst-inactivating impurities which may be present in these materials are scavenged by means of the organometal compound. The mixing in the preform mixing zone is preferably accomplished by vigorous agitation of the materials in that zone.

The catalyst used in preparing the cis-polybutadiene product is selected from the group consisting of (1) a catalyst which forms on mixing an organometal compound having the formula $R_3Al$, wherein R is an organo radical selected from the group consisting of alkyl, cycloalkyl, aryl, alkaryl, aralkyl alkylcycloalkyl, and cycloalkylaryl radicals containing up to 15 or 20 carbon atoms per radical, titanium tetrachloride and titanium tetraiodide, (2) a catalyst which forms on mixing an organometal compound having the formula $R_3Al$, wherein R is an organo radical as defined above, titanium tetrachloride, and elemental iodine, (3) a catalyst which forms on mixing an organometal compound having the formula $R_3Al$, wherein R is an organo radical as defined above, titanium tetrachloride, and an inorganic halide having the formula $M'''I_a$, wherein $M'''$ is beryllium, zinc, cadmium, aluminum, gallium, indium, thallium, silicon, germanium, tin, lead, phosphorus, antimony, arsenic and bismuth, and $a$ is an integer from 2 to 5, inclusive, and (4) a catalyst which forms on mixing an organometal compound having the formula $R_3Al$, wherein R is as defined above, titanium tetrachloride, and an iodine component comprising the reaction product of iodine and a diene such as 1,3-butadiene or isoprene.

The following examples of preferred catalyst systems since they are effective in polymerizing 1,3-butadiene to a cis 1,4-polybutadiene: triisobutylaluminum, titanium tetrachloride and titanium tetraiodide; triethylaluminum, titanium tetrachloride and titanium tetraiodide; triisobutylaluminum, titanium tetrachloride and iodine; triphenylaluminum, titanium tetraiodide and titanium tetrachloride; triphenylaluminum, titanium tetrachloride and iodine; tri-alpha-naphthylaluminum, titanium tetrachloride and iodine; tricyclohexylaluminum, titanium tetrachloride and titanium tetraiodide; triisobutylaluminum, titanium tetrachloride, and antimony triiodide; triisobutylaluminum, titanium tetrachloride and aluminum triiodide; triethylaluminum, titanium tetrachloride, and phosphorus triiodide; tri-n-dodecylaluminum, titanium tetrachloride, and tin tetraiodide; tri-n-butylaluminum, titanium tetrachloride, and antimony triiodide; tricyclopentylaluminum, titanium tetrachloride, and silicon tetraiodide; triphenylaluminum, titanium tetrachloride, and gallium triiodide; triethylaluminum, titanium tetrachloride, and 1,4-diiodo-2-butene; triisobutylaluminum, titanium tetrachloride, 1,4-diiodo-2-butene; triethylaluminum, titanium tetrachloride, and 1,4-diiodo-2-methyl-2-butene; triisobutylaluminum, titanium tetrachloride, and 1,4-diiodo-2-methyl-2-butene; triethylaluminum, titanium tetrachloride, and 1,4-diiodo-2,3-dimethyl-2-butene; triisobutylaluminum, titanium tetrachloride, and 1,4-diiodo-2,3-dimethyl-2-butene; triethylaluminum, titanium tetrachloride, and 1,4 - diiodo - 2 - pentene; and triisobutylaluminum, titanium tetrachloride, and 1,4-diiodo-2-pentene.

The polymerization process of this invention is carried out in the presence of a hydrocarbon diluent which is not deleterious to the catalyst system. Examples of suitable diluents include aromatic, paraffinic and cycloparaffinic hydrocarbons, it being understood that mixtures of these materials can also be used. Specific examples of suitable hydrocarbon diluents include benzene, toluene, zylene, n-butane, isobutane, n-pentane, isooctane, n-dodecane, cyclopentane, cyclohexane, methylcyclohexane, and the like. It is often preferred to employ aromatic hydrocarbons as the diluent.

The amount of catalyst which is used in the process of this invention can vary over a rather wide range. The amount of the organometal used in the catalyst composition is usually in the range of 1.0 to 20 mols per mol of the halogen-containing component. However, a preferred mol ratio is from 2.5:1 to 12:1 of the organometal compound to the halogen-containing component. When using a catalyst comprising an organometal compound and more than one metal halide, e.g., titanium tetrachloride and titanium tetraiodide, or titanium tetrachloride and aluminum iodide, the mole ratio of the tetrachloride to the iodide is usually in the range of 0.05:1 to 5:1. With a catalyst system comprising an organometal compound, a titanium chloride and an iodine component such as elemental iodine, the mol ratio of titanium halide to iodine is generally in the range of 10:1 to 0.25:1, preferably 3:1 to 0.25:1. The concentration of the total catalyst composition, i.e., organometal and halogen-containing component, is generally in the range of 0.01 to 10 weight percent, preferably in the range of 0.01 to 5 weight percent, based on the total amount of monomer charged to the reactor system. It is to be understood that additional amounts of the organometal compound can be employed for the purpose of scavenging impurities from the monomer and diluent.

A better understanding of this invention can be obtained by referring to the drawing. While the process will be described with relation to the polymerization of 1,3-butadiene with a specific catalyst system in the presence of a particular diluent, it is, of course, evident from the foregoing disclosure that it is not intended to so limit the invention.

As shown in the drawing, the diluent toluene, butadiene and triisobutylaluminum (TIBA) are separately introduced into line 11 through lines 12, 13 and 14, respectively. Recycle butadiene and toluene can be returned to the process by line 15. These materials, which are at least partially mixed in line 11, are passed through indirect heat exchanger 16. In this heat exchanger, the mixture of diluent, monomer and organometal is precooled prior to introduction into preform mixer 17. Since the preform mixer is usually operated at a temperature in the range of zero to 100° F., preferably between 15 and 35° F., the mixture is cooled in the heat exchanger to a temperature which will result in the temperature in the preform mixer being in the desired temperature range. The catalyst system employed in this specific embodiment of the invention consists of triisobutylaluminum, titanium tetrachloride and iodine. The titanium tetrachloride and free iodine are charged separately to the system through lines 18 and 19, and these streams are subsequently combined in line 21 for introduction into mixer 17. It is usually preferred to charge the diluent, monomer and organometal compound in the manner described since the presence of the organometal in the resulting mixture tends to scavenge any catalyst inactivating impurities present in the diluent and monomer streams prior to the catalyst formation step. Furthermore, it is generally preferred to introduce the halide and halogen as a separate stream since it has been found that gel sometimes results if a halide is permitted to contact the monomer and diluent in the absence of organometal. However, it is to be understood that it is not intended to limit the invention to the particular charging procedure employed since other methods of adding the several materials to the preform mixer can be used with good results. For example, it is within the scope of the invention to charge each of the materials to the preform mixer as a separate stream.

Preform mixer 17 is provided with an impeller 22, which is rotated by a motor (not shown). Throuph the operation of the impeller, the materials introduced into the mixer are vigorously agitated to an extent exceeding that normally provided in a polymerization reactor in order to provide good mixing. The mixer is operated liquid full, and the mixture is permitted to remain in the mixer for only very short residence times. The residence time of the mixture in the preform mixer is not more than 1 minute, preferably from 15 to 45 seconds. Because of the short residence time in the preform mixer, there is very little polymer formed in the preform mixer. For example, the amount of polymer formed in mixer 17 is usually less than 0.1 weight percent of the total mixture.

The mixture formed in mixer 17 is removed therefrom through line 23, divided into three equal streams in conduits 24, 26 and 27 for passage to A reactors 28, 29 and 31, respectively. Conduits 32, 33 and 34 are provided to convey the reaction mixture to B reactors 36, 37 and 38, respectively. Each reactor is provided with agitation means and heat exchange means (not shown) of conventional structure. Conduits 39, 41 and 42 extend from the output of the B reactors to mixers 43, 44 and 46, respectively. These conduits should be short. Shortstop supply conduits 47, 48 and 49 extend to mixers 43, 44 and 46, respectively. Conduits 51, 52 and 53 extend, respectively, from mixers 43, 44 and 46 to common removal conduit 54 which communicates with mixer 56 to which antioxidant, such as phenyl-beta-naphthylamine, is supplied by conduit 57. Conduit 58 goes to polymer recovery. The shortstop can also be added to conduit 58 to allow some additional polymerization to occur after the effluent streams from the last reaction zone in each series of reaction zones have been combined.

Active hydrogen containing compounds are used as shortstopping agents, the catalyst-inactivating agents. Examples of these include water, rosin acid, and normally liquid aliphatic alcohols.

In operation, toluene and butadiene are passed through valves 63 and 73, respectively. Analyzer recorder controller 72 is operatively connected to valve 73 in butadiene supply line 13 and manipulates valve 73 to provide the monomer level called for by analyzer recorder controller 72. Flow recorder controller 64 measures flow of reaction effluent in line 51 and resets flow recorder controller 62 in the toluene supply line 12.

Flow recorder controllers 67 and 69, each provided with a set point value, measure flow in lines 52 and 53, respectively, and manipulate valves 68 and 71 in response to said flow measurement. Pressure recorder controller 74 is operatively connected to valve 76 in removal line 58, this controller being set to maintain a constant pressure in the system by sensing the pressure in line 11.

In the above described control system the butadiene feed rate is manipulated by analyzer 72 as the amount of butadiene in the total solvent-monomer stream varies. Analyzer recorder controller 72 detects the variation and manipulates valve 73 until the set point value is again reached, thereby maintaining the desired monomer level in the toluene-monomer stream passing to the reactors. Should the flow rate measured by flow recorder controller 64 deviate from its set point value, flow recorder controller 62 will be reset accordingly to bring the flow in line 51 back to its set point rate. The net effect of the above described control system is to provide each of the reactor trains with a constant total flow of solvent and monomer and to further provide a solvent-monomer stream which contains a fixed concentration of monomer. The control system also provides for withdrawing a controlled volume from the reactors. The control system in essence provides equal residence time in each reactor train and provides a fixed feed composition to the reactors.

The polymerization can be conducted at a temperature varying over a relatively wide range although it is usually preferred that the temperature should not exceed 300° F. It is usually preferred to operate at a temperature in the range of −30 to 160° F., more desirably at a temperature in the range 20 to 50° F. As noted hereinbefore, the preform mixer temperature is operated at a temperature in the range of 0 to 100° F. The specific temperature employed in the mixer is preferably lower than that maintained in the polymerization reactors.

Furthermore, it is preferable to operate each A reactor at a lower temperature than the following B reactor, for instance, these temperatures can be 50 to 70° F., respectively. The residence time is preferably 15 to 60 minutes per reactor. Conversion in the A reactors should, preferably, range from 50 to 70 percent and continue to a total of 60 to 95 percent in the B reactors. Pressures within the ranges of 5 to 100 p.s.i.g. can be used.

Various methods can be used for recovering the polymer from the solution. In a preferred method for recovering the polymer from solution, monomer is removed by flashing and the diluent is removed in a stream stripping operation. In another method, the flashed polymer solution is concentrated by removing a portion of the diluent, e.g., by heating the solution to slightly above the boiling point of the diluent, after which the concentrated solution is passed into an extractor-extruder. The remainder of the diluent is vaporized by working the material in the extractor-extruder, and a polymer product free of diluent is recovered in the form of strands. After cooling the polymer strands, the strands are cut or shredded by means of a chopper or a rotating blade cutter.

The following example illustrates my invention but should not be considered unduly limiting. Cold flow is determined by extruding the rubber through a ¼ inch orifice at 3.5 p.s.i. pressure and a temperature of 50° C. (122° F.). After allowing 10 minutes to reach steady state, the rate of extrusion is measured and the value reported in milligrams per minute.

EXAMPLE

The system shown in the drawing is used for the polymerization of 1,3-butadiene with a catalyst obtained by mixing triisobutylaluminum, iodine, and titanium tetrachloride in a 6/2/1 mol ratio, each reactor A and reactor B having a capacity of 4000 gallons and mixer 22 having a capacity of 50 gallons. A temperature of 50° F. is used in each A reactor and 70° F. in each B reactor. The total feed of butadiene is 186 pounds per minute giving 61.8 pounds per minute for each train. Total toluene feed is 1668 pounds per minute giving 556 pounds per minute per train. The feed rate is set at 186 pounds per minute of butadiene and a 9/1 ratio of toluene to butadiene gives a flow of 89 gallons per minute through each train. This results in a residence time in each reactor of 45 minutes. Over a period of time, such operation produces a polymer with a cold flow in the range of 0.5 to 1.5 milligrams per minute.

When the same six reactors are connected in a series and supplied with the same feed composition, the first reactor being maintained at 50° F. with the temperature gradually increasing through the series to a figure of 70° F. in the sixth reactor, the reaction time in each is reduced to 15 minutes to give the same overall reaction time. Such operation produces a polymer with a cold flow in the range of 2 to 4.5 milligrams per minute.

This reduction in cold flow is very significant.

While I have shown three trains of two reactors each, this, of course, can be varied. A larger or greater number of trains can be used and each train can have more than two reactors. For instance, one can operate using two trains, each having three reactors in series Certain modifications of the invention will become apparent to those skilled in the art and the illustrative details disclosed are not to be construed as imposing unnecessary limitations on the invention.

I claim:

1. In a process in which 1,3-butadiene is polymerized in the presence of a hydrocarbon diluent with a catalyst which forms on mixing (a) an organometal component selected from the group consisting of triethylaluminum and triisobutylaluminum, (b) titanium tetrachloride, and (c) an iodine component, the improvement which comprises mixing with vigorous agitation said catalyst in the presence of said hydrocarbon diluent and the butadiene to be polymerized, in a mixing zone; removing said diluent, butadiene, and thus formed catalyst prior to the formation of as much as 0.1 weight percent polymer; dividing the effluent from said mixing zone into a plurality of streams, the residence time in said mixing zone being from 15 to 45 seconds; providing a corresponding series of reaction zones, each series having from 2 to 3 separate reaction zones; introducing, respectively, each stream into the first reaction zone of the corresponding series of reaction zones, each reaction zone of each series of reaction zones being operated under essentially the same conditions as that in the corresponding reaction zone in another series; maintaining a temperature in said reaction zones within the range of −30 to 160° F., and maintaining a temperature in said mixing zone which is lower than said temperature in said reaction zones; regulating the residence time in each series of reaction zones by controlling the effluent removed from each series of reaction zones; maintaining constant pressure on the system by controlling total effluent removed; and combining the effluent from the last reaction zone in each series of reaction zones and recovering from said thus combined stream polymer as a product of the process.

2. The process of claim 1 wherein each series of reaction zones comprises a first reaction zone and a second reaction zone and where there are three series of said first and second reaction zones.

3. The process of claim 1 wherein each series of reaction zones comprises three reaction zones and wherein there are two series of zones.

4. The process according to claim 1 wherein each series of reaction zones comprises a first reaction zone and a second reaction zone.

5. The process of claim 1 wherein said iodine component is elemental iodine.

6. The process according to claim 3 wherein said organometal component is triethylaluminum and said iodine component is elemental iodine.

References Cited

UNITED STATES PATENTS

| | | | |
|---|---|---|---|
| 2,443,817 | 6/1948 | Draeger et al. | 260—95 |
| 2,825,721 | 3/1958 | Hogan et al. | 260—94.3 |
| 3,035,040 | 5/1962 | Findlay | 260—95 |
| 3,178,402 | 4/1965 | Smith et al. | 260—94.2 |
| 2,658,054 | 11/1953 | Coleman et al. | 260—95 |
| 2,663,699 | 12/1953 | Bloem et al. | 260—95 |
| 2,872,438 | 2/1959 | Carroll et al. | 260—83.7 |
| 3,057,840 | 10/1962 | Pollock | 260—94.3 |
| 3,182,052 | 5/1965 | Naylor | 260—94.3 |
| 3,189,592 | 6/1965 | Norwood et al. | 260—94.3 |

OTHER REFERENCES

Murphy: "The U.S. Synthetic Rubber Program Moves Forward," C & E News, vol. 21, No. 11, June 10, 1943, pp. 863–877 relied on.

JOSEPH L. SCHOFER, Primary Examiner

R. A. GAITHER, Assistant Examiner

U.S. Cl. X.R.

260—95